United States Patent [19]
Moreland

[11] Patent Number: 6,112,341
[45] Date of Patent: Sep. 5, 2000

[54] ROTARY PULSING VALVE

[75] Inventor: Gerald W. Moreland, Orange, Calif.

[73] Assignee: ITT Manufacturing Enterprises, Inc., White Plains, N.Y.

[21] Appl. No.: 08/302,207

[22] Filed: Sep. 8, 1994

[51] Int. Cl.[7] .................................................. A61H 33/02
[52] U.S. Cl. ...................................... 4/541.1; 137/624.13
[58] Field of Search ........................... 4/490, 492, 541.1; 137/624.13; 251/59

[56] References Cited

U.S. PATENT DOCUMENTS

| | | | |
|---|---|---|---|
| 2,081,510 | 5/1937 | Smart | 137/624.14 |
| 2,100,154 | 11/1937 | Ashton | 137/624.13 |
| 2,302,061 | 11/1942 | Schirm | 137/624.13 X |
| 3,307,579 | 3/1967 | Beddoes | 137/624.13 X |
| 3,730,208 | 5/1973 | Lewis | 137/119 |
| 4,592,379 | 6/1986 | Goettl | 137/119 |
| 4,655,252 | 4/1987 | Krumhansl | 251/59 X |
| 4,751,919 | 6/1988 | Thomsen | 601/156 |
| 4,817,656 | 4/1989 | Gould | 137/2 |
| 4,908,016 | 3/1990 | Thomsen | 601/156 |
| 4,989,641 | 2/1991 | Jones et al. | 137/625.11 |
| 5,003,646 | 4/1991 | Stamp et al. . | |
| 5,158,076 | 10/1992 | Thomsen | 601/156 |
| 5,548,854 | 8/1996 | Bloemer et al. . | |

*Primary Examiner*—Robert M. Fetsuga
*Attorney, Agent, or Firm*—Knobbe, Martens, Olson & Bear LLP

[57] ABSTRACT

A pulsing valve for routing water flow from an inlet line to outlet lines connected to water jets arranged in an array to massage an occupant of a whirlpool spa or bathtub is provided. The pulsing valve includes a water turbine driving a selector disk through a reduction gear drive. The selector disk contains openings which oppose individual outlet water lines and direct water flow to them. Rotation of the selector disk switches water flow among the individual outlet water lines, causing the massaging water jet location to move, improving the quality of the resulting massage.

7 Claims, 10 Drawing Sheets

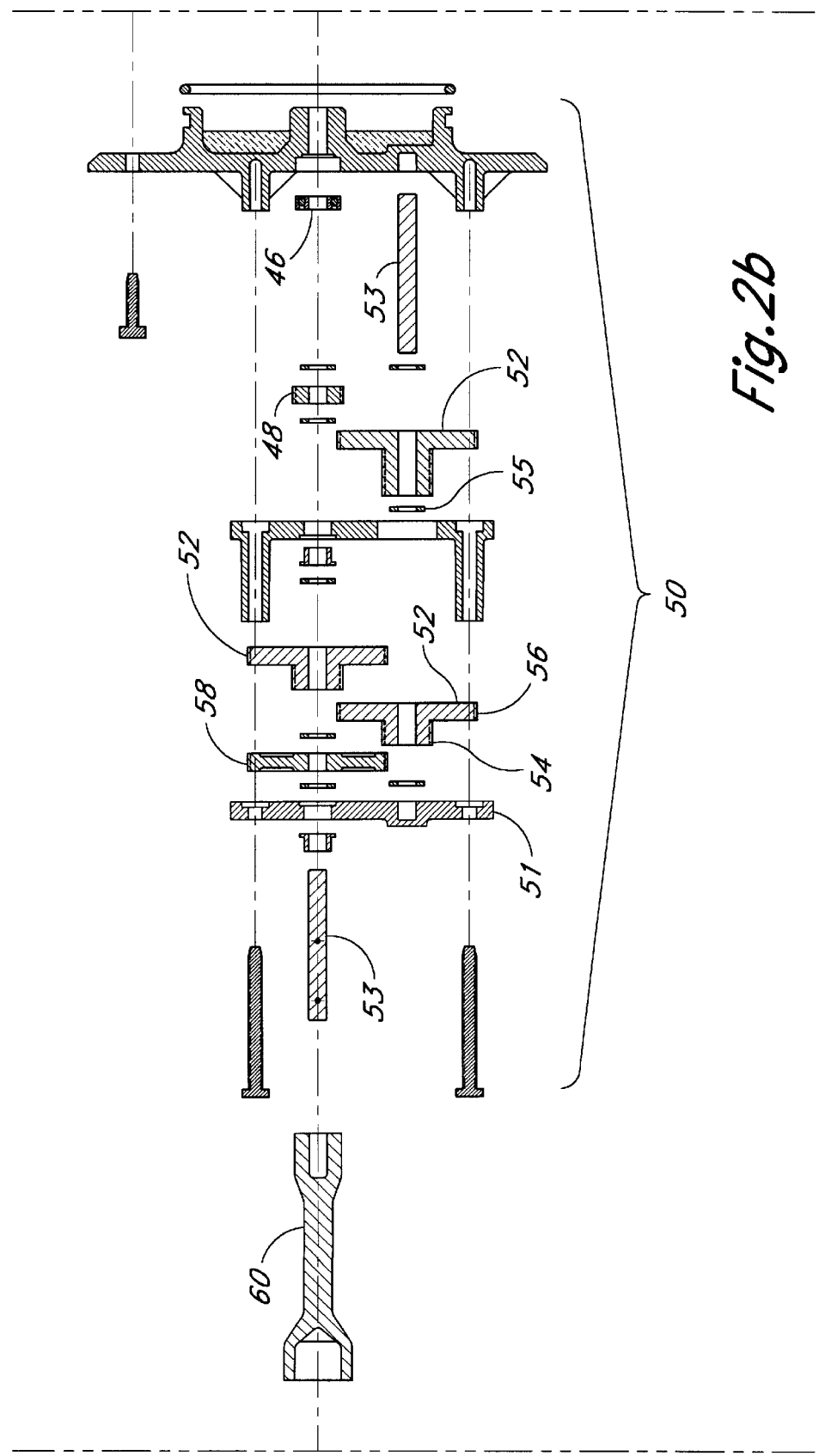

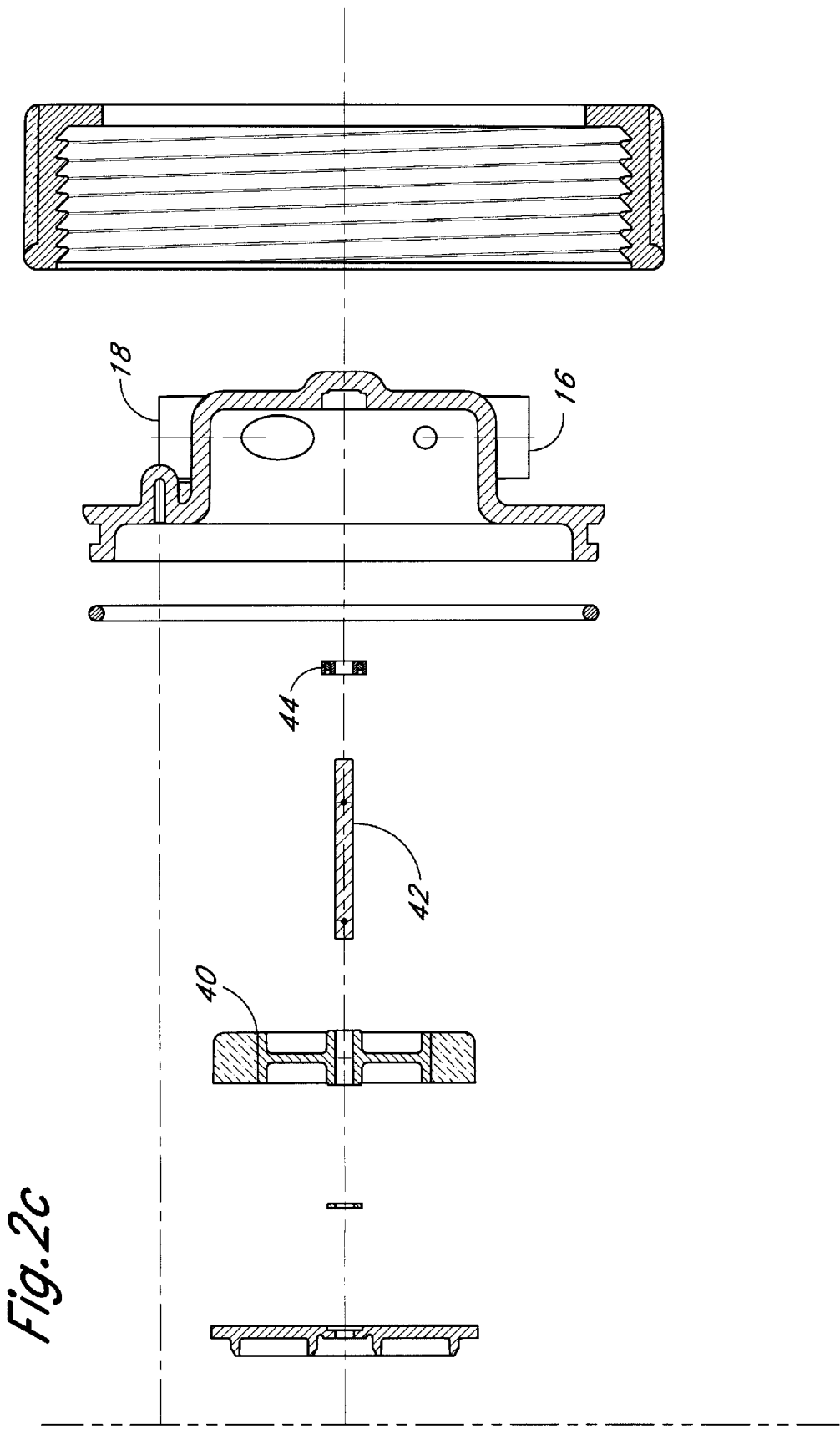

ROTARY PULSING VALVE

BACKGROUND OF THE INVENTION

1. Field of the Invention

The present invention relates to rotary pulsing valves for whirlpool spas.

2. Background of the Invention

Whirlpool spas or jacuzzis typically contain one or more wall-mounted water jets for massaging an occupant of the spa. A more effective massage may be provided if several jets are located near each other in a cluster and the water flow is sequentially switched between individual jets in the cluster. This switching may be accomplished by a multiplexing or pulsing valve.

One such valve has been sold under the name CYCLE-JET. The CYCLE-JET valve includes a turbine wheel driven by water flow from the valve inlet. The turbine wheel contains a number of openings which shunt water to output openings of the valve connected to the individual water jets. As the turbine wheel rotates, the openings in the turbine wheel align themselves with individual openings in the valve which are connected to the output openings, thereby allowing water to flow from the valve inlet into one of the outlet openings at a time. Rotation of the turbine results in the selection of different output openings, and therefore different water jets. The valve therefore allows the location of water flow to move about within the cluster of water jets rather than being fixed at a single location. This feature allows the water jets to massage a larger area of the spa occupant's body.

Although it allows movement of the massaging water jet, the CYCLE-JET valve suffers from operational difficulties. Rotation of the CYCLE-JET's turbine wheel is easily impeded by the accumulation of small grains of sand or grit between the turbine wheel and the valve housing. Such accumulations of small amounts of contaminants cause the turbine wheel to seize, thereby halting the valve's switching operation. Because the CYCLE-JET is typically mounted in the ground near the whirlpool, removing sand accumulations from a seized valve is often a difficult task.

Additionally, the CYCLE-JET does not allow its user to independently vary the speed of switching and force of water emitted from the jets because water flow from the valve inlet also drives the switching mechanism. Output water pressure and switching speed are therefore inextricably related to each other and may not be varied independently.

Consequently, a reliable pulsing valve which sequentially switches an inlet water stream among individual jets for massaging the occupant of a whirlpool is desirable.

SUMMARY OF THE INVENTION

In accordance with the present invention, a rotary pulsing valve is provided in a massaging system for directing water flow from a wall of a whirlpool to massage a selected part of a whirlpool occupant's body. The massaging system includes a closely-spaced array of water jets mounted in the wall of the whirlpool. The configuration of the jet array is chosen to match the dimensions of the selected part of the occupant's body to allow the water jets to massage the selected part of the occupant.

The massaging system also includes a distributing valve connected to the array of water jets for sequentially routing the water flow through the water jets. The distributing valve has an inlet portion, a selector disc, a first drive shaft, a reduction gear drive, a second drive shaft, a water turbine, and a plurality of outlets. The first drive shaft is driven by the water turbine and is connected to the reduction gear drive. The second drive shaft is connected to the output of the reduction gear drive and drives the selector disc. The selector disc sequentially distributes the water flow through each of the outlets, which are connected to the water jets. In one embodiment of the present invention, the reduction gear drive is a Geneva drive.

According to another aspect of the present invention, an apparatus for massaging a body part of an occupant of a whirlpool spa is provided. The apparatus includes a rectangular array of water jets mounted in the wall of the whirlpool for sequentially supplying streams of high-pressure water to the body part of the occupant. The length and width of the array are chosen to match the dimensions of the body part. The apparatus also includes a multiplexing valve connected to the array of water jets for sequentially directing water flow through the jets, the multiplexing valve being driven by a water turbine through a reduction gear assembly.

According to yet another aspect of the present invention, the reduction gear assembly further includes a first water inlet for supplying water to the water turbine, a plurality of outlets connected to the water jets, a second water inlet for supplying water to the outlets, and an output shaft connected to and driven by the water turbine. The output shaft is connected to the reduction gear assembly. The reduction gear assembly also includes a drive shaft connected thereto and driven by the output shaft at a lower angular speed than the output shaft and a selector disk connected to the drive shaft and containing at least one opening. The opening allows water from the second water inlet to pass into a selected one of the outlets.

The reduction gear assembly included in the pulsing valve of the present invention is advantageously resistant to sand accumulation and therefore solves the problem of jamming which plagued the prior-art CYCLE-JET valve. The pulsing valve of the present invention may also be adapted to feed as many water jets as desired. The switching speed of the valve of the present invention may advantageously be controlled independently of the water pressure delivered from the outlets through the placement of a valve in the turbine water inlet.

BRIEF DESCRIPTION OF THE DRAWINGS

FIG. 2 is an illustration of the relationship between FIGS. 2a, 2b, and 2c illustrating one embodiment of the pulsing valve of the present invention.

FIG. 2b is an expanded, exploded cross-sectional view of a portion of the pulsing valve depicted in FIG. 2.

FIG. 2c is an expanded, exploded cross-sectional view of a portion of the pulsing valve depicted in FIG. 2.

DETAILED DESCRIPTION OF THE PREFERRED EMBODIMENTS

Figure 1:
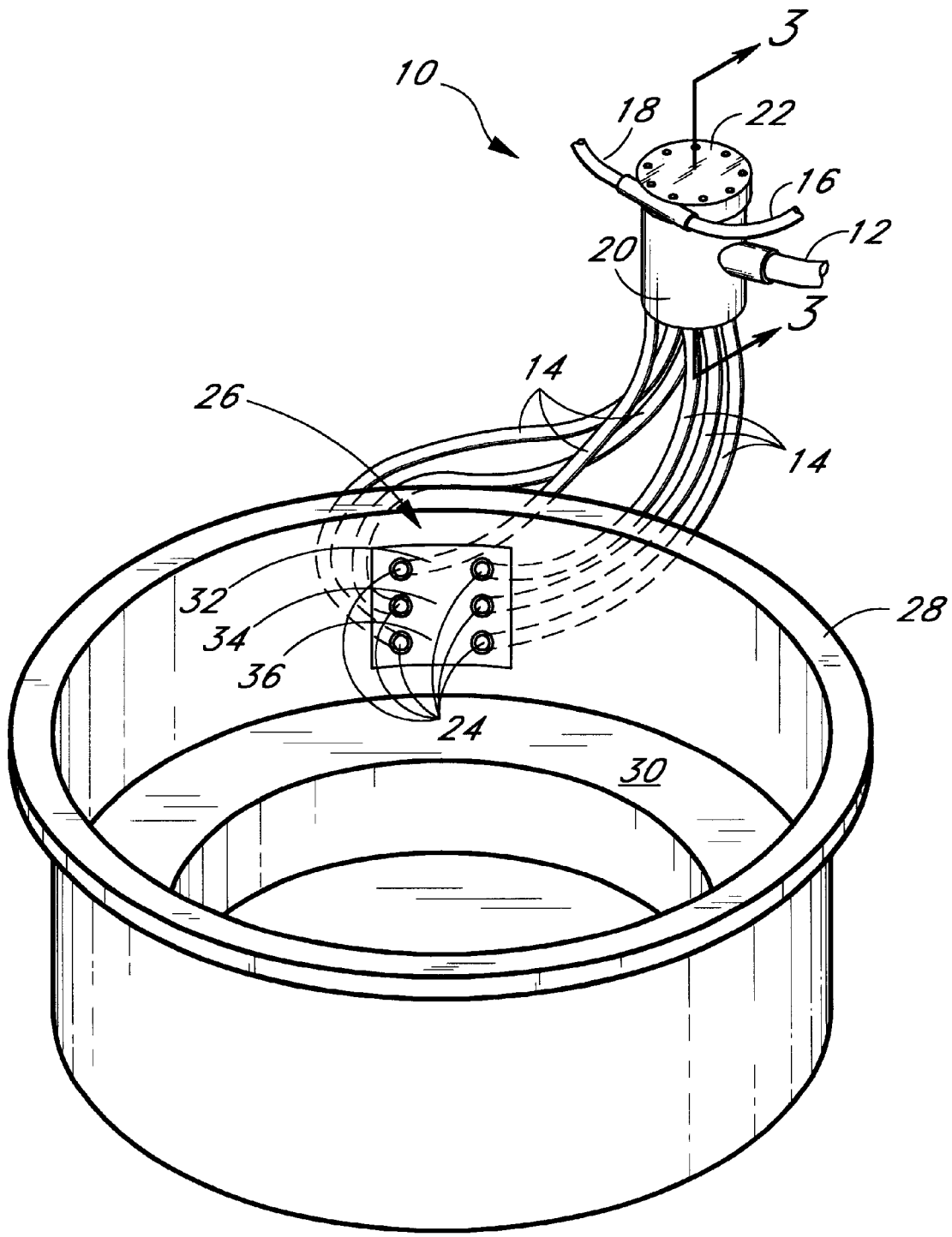
FIG. 1 illustrates generally the pulsing valve of the present invention and its operating environment.
Figure 2A:
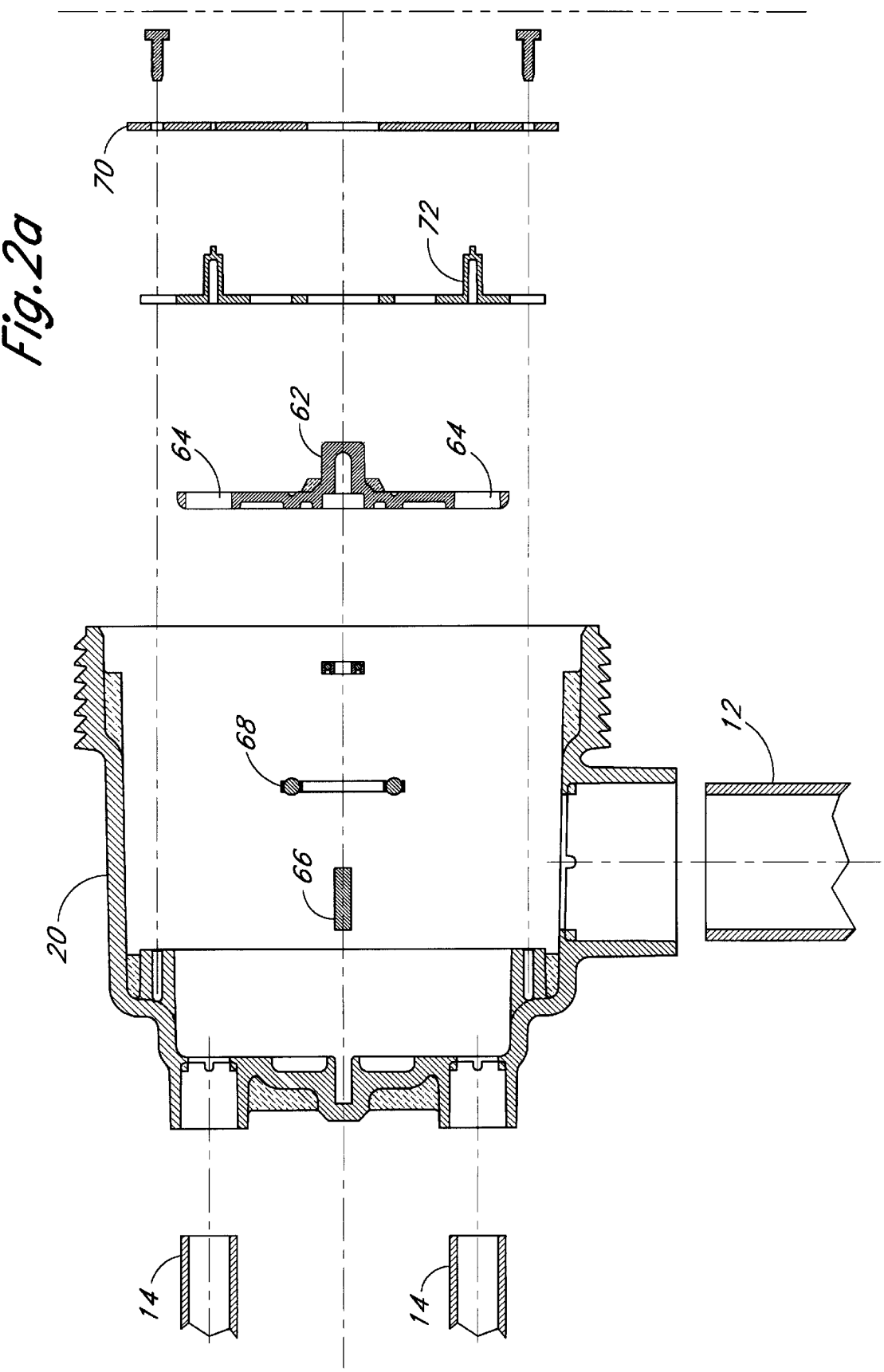
FIG. 2a is an expanded, exploded cross-sectional view of a portion of the pulsing valve depicted in FIG. 2.
Figure 3:
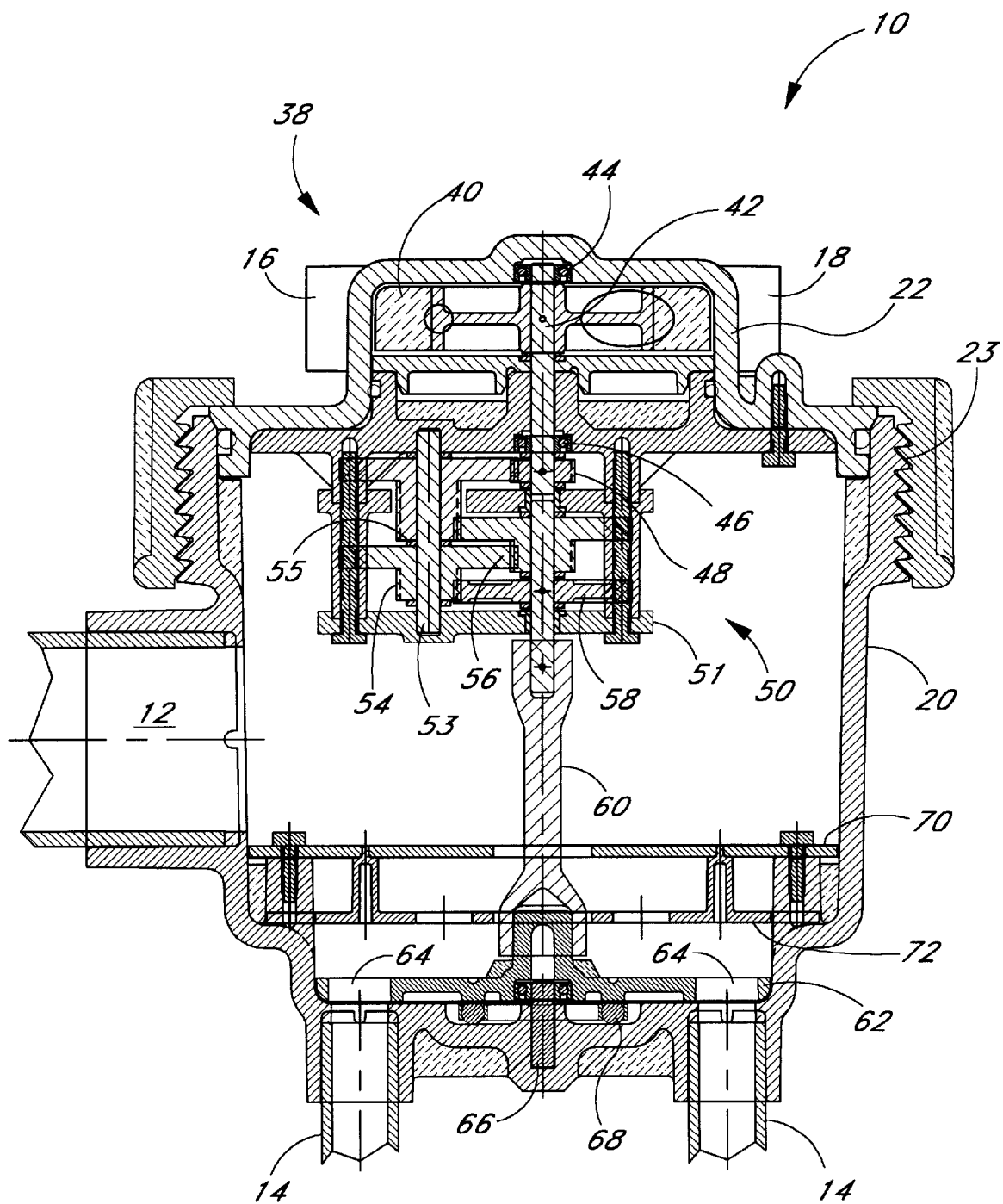
FIG. 3 is an assembled cross-sectional view of the embodiment of FIG. 2.

Referring to the drawings, FIG. 1 illustrates a rotary pulsing valve 10. The valve 10 includes an inlet line 12, a plurality of outlet lines 14, a water turbine inlet line 16, and a water turbine exhaust line 18. The valve body includes a base 20 and a top 22 connectable to the base by threads 23 (FIG. 3). The valve outlets 14 are each connected to lines which feed a plurality of water jets 24 located in a cluster 26 in a wall of a whirlpool 28.

In operation, water flows through the valve inlet 12 into the valve base 20, where it is directed by the valve into one or more of the outlet lines 14. It then flows into the whirlpool 28 through one or more of the water jets 24.

In the embodiment illustrated in FIG. 1, the jets 24 are arranged in a rectangular array and six jets are provided in three rows of two jets apiece. In this embodiment, the occupant of the spa 28 sits on a bench 30 in the whirlpool and situates himself so that his back faces the array or cluster 26 of jets so that each column of jets can massage one side of the occupant's back. The pulsing valve 10 sequentially directs the jets' water flow so that the occupant's back is massaged by each row of jets from top to bottom. It achieves this object by first directing water flow into a top row 32 of jets. After the passage of a preset time interval, the valve 10 switches water flow from the top row 32 to a middle row 34 of jets. After the passage of another preset time interval, the valve 10 switches water flow from the middle row 34 to a bottom row 36 of jets. The cycle is repeated when the valve switches water flow from the bottom row 36 back to the top row 32 of water jets. While only six jets are shown in FIG. 1, it should be understood that the present invention can operate with more than six jets or less than six jets as necessary, depending on the type of massage for which the spa 28 is configured. Furthermore, the plumbing connections between the jets 24 and the rotary pulsing valve 10 can be made in virtually any configuration to provide virtually any sequence of jet operation.

The embodiment of the valve 10 shown in FIG. 1 is illustrated in exploded form in FIGS. 2, 2a, 2b, and 2c and in an assembled cross-sectional view in FIG. 3. The valve's selector mechanism, described in greater detail below, is powered by a water turbine 38 located in the top portion 22 of the valve. Power for the turbine 38 is provided by water flow from the inlet line 16 which is separate from the valve's main water inlet line 12. The provision of a separate water inlet line 16 for driving the turbine 38 advantageously allows the switching speed of the selector mechanism to be varied independently of the water pressure reaching the spa occupant by the provision of a valve (not shown) in the water inlet line 16. When this valve is in the fully open position, water flows into the turbine 38 with greater pressure, thereby rotating the turbine 38 at a greater speed and providing a relatively short switching interval. If, on the other hand, the valve is partially closed, the turbine 38 will rotate more slowly, thereby switching the output line less frequently.

The turbine 38 receives water from the water inlet line 16 and exhausts water to the exhaust line 18 after extracting kinetic energy from the water stream. Water from the inlet line 16 turns a turbine wheel 40. The turbine wheel 40 is connected to a first drive shaft or output shaft 42 supported by bearings 44 and 46.

The first drive shaft 42 rotates a driving gear 48 connected to a reduction gear drive 50 mounted in a housing 51. In the embodiment illustrated in FIGS. 2 and 3, the reduction gear drive 50 includes three reducing gears 52. Two of the reducing gears 52 are mounted on an auxiliary shaft 53 and separated by a spacer 55. Each of the gears 52 has a driving portion 54 and a driven portion 56. The driving portion of each gear 52 has 14 teeth, while the driven portion has 45 teeth. The driving portion of the final reducing gear 52 rotates an output gear 58, which is connected to an output or second drive shaft 60. This output shaft 60 supplies power to the selector, described in more detail below. In the embodiment illustrated in FIGS. 2 and 3, the ratio of the angular velocity of the output drive shaft 60 to that of the first drive shaft 42 less than 1:100. This reduction in angular velocity of the output drive shaft 60 advantageously allows it to provide sufficient torque to rotate the selector even in the presence of sand or other contaminants, thereby eliminating the seizure problem present in prior-art devices.

Figure 4:
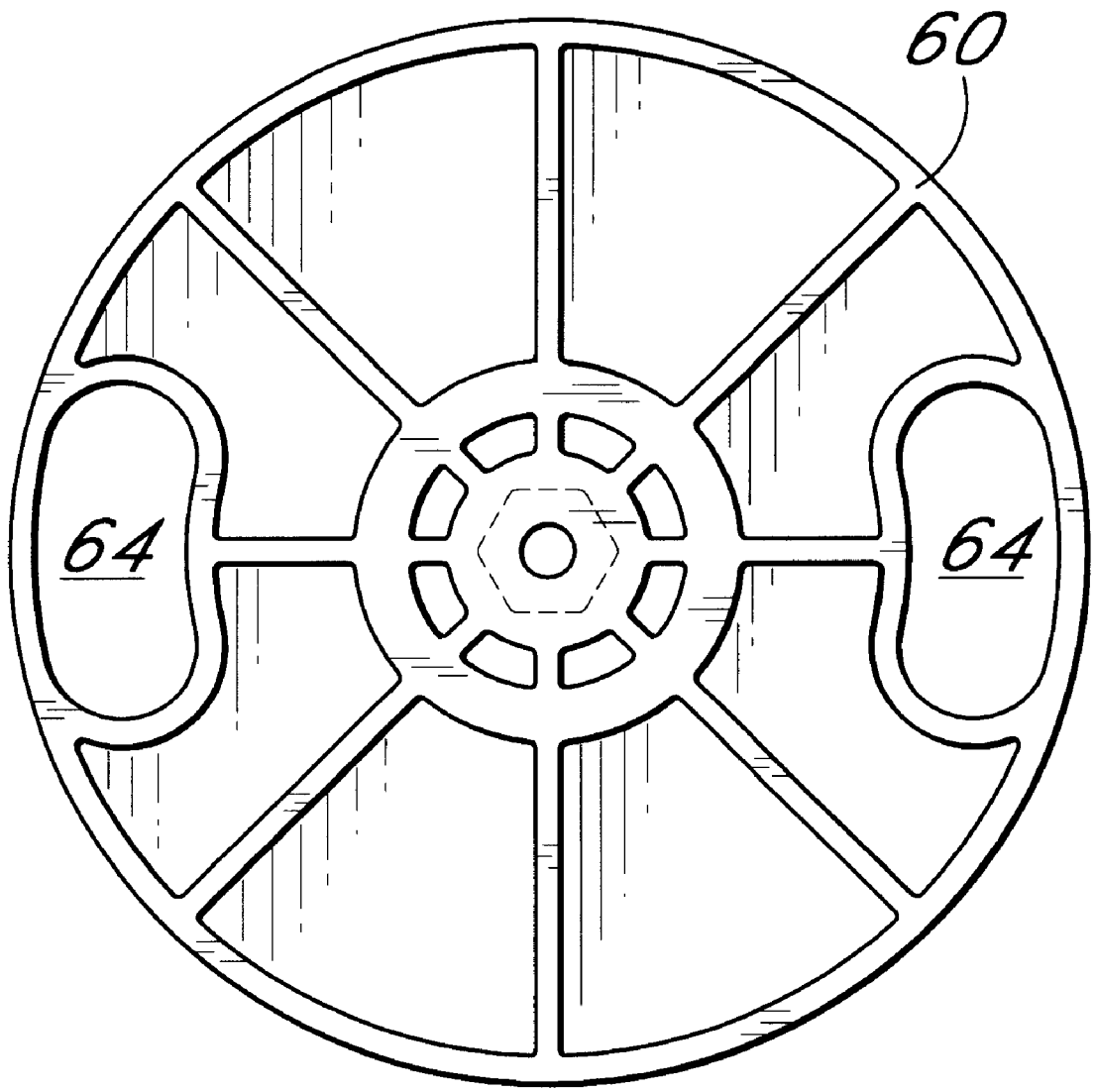
FIG. 4 is a top view of the selector disk contained in the pulsing valve of FIG. 2.

The output drive shaft 60 is connected to a selector disk 62, illustrated in top view in FIG. 4. The selector disk 62 is mounted on a shaft 66 and on thrust bearings 68 which allow the output drive shaft 60 to rotate the disk. The selector disk 62 is solid except for two openings 64. The openings 64 oppose individual water outlet lines 14. The provision of the openings 64 at 180 degree intervals advantageously balances the forces applied to the selector 62 by water flow through it during operation of the spa.

In operation, water passes into the body 20 of the valve through the inlet 12. The water then travels through diffuser disks 70 and 72 which contain perforations to allow the passage of the water to the region of the selector disk 62 without flowing forcefully against the disk 62. Water then passes through the openings 64 in the selector to the individual outlet lines 14 which are opposite the openings 64. As the output drive shaft 60 rotates the selector disk 62, the openings 64 in the selector disk rotate, thereby directing water flow to different outlet lines 14 and sequentially switching water flow among the individual lines 14 in a periodic manner.

While the selector disk illustrated in FIG. 4 contains two outlet openings, it can also be provided with only one opening or with three or more openings. The number of openings 64 provided in the selector disk depends on the number of outlet lines 14 which are provided as well as the geometric configuration of the jets and the desired massage effect. In the embodiment illustrated in FIGS. 1–4, in which the whirlpool is configured for back massage, it is desirable to provide six outlet lines 14 and to energize them pairwise. As mentioned above, the energizing of the lines pairwise also balances the forces applied to the selector disk 60 by water flow.

Figure 5:
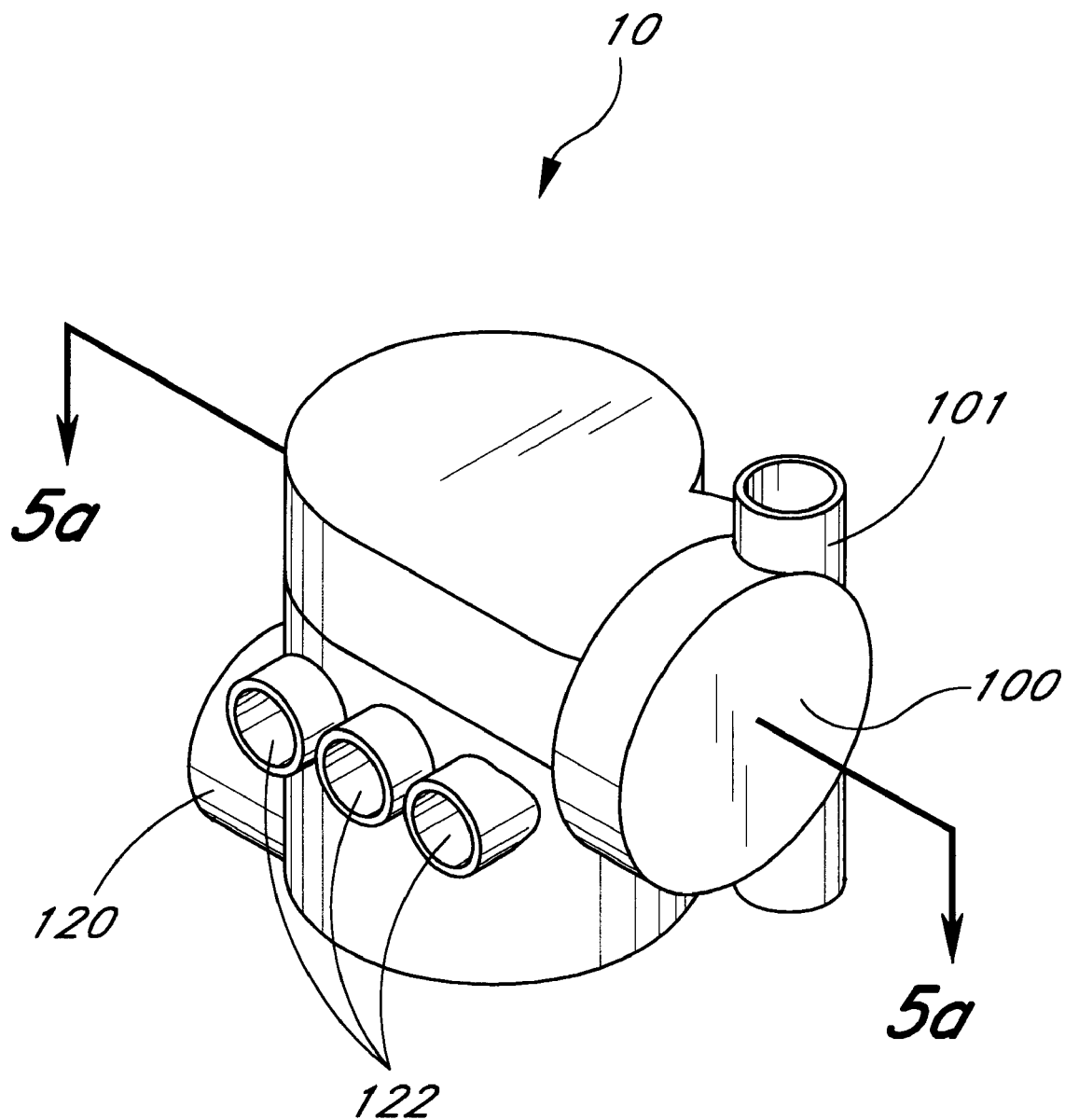
FIG. 5 is a perspective view of an alternate embodiment of the pulsing valve of the present invention.
Figure 5A:
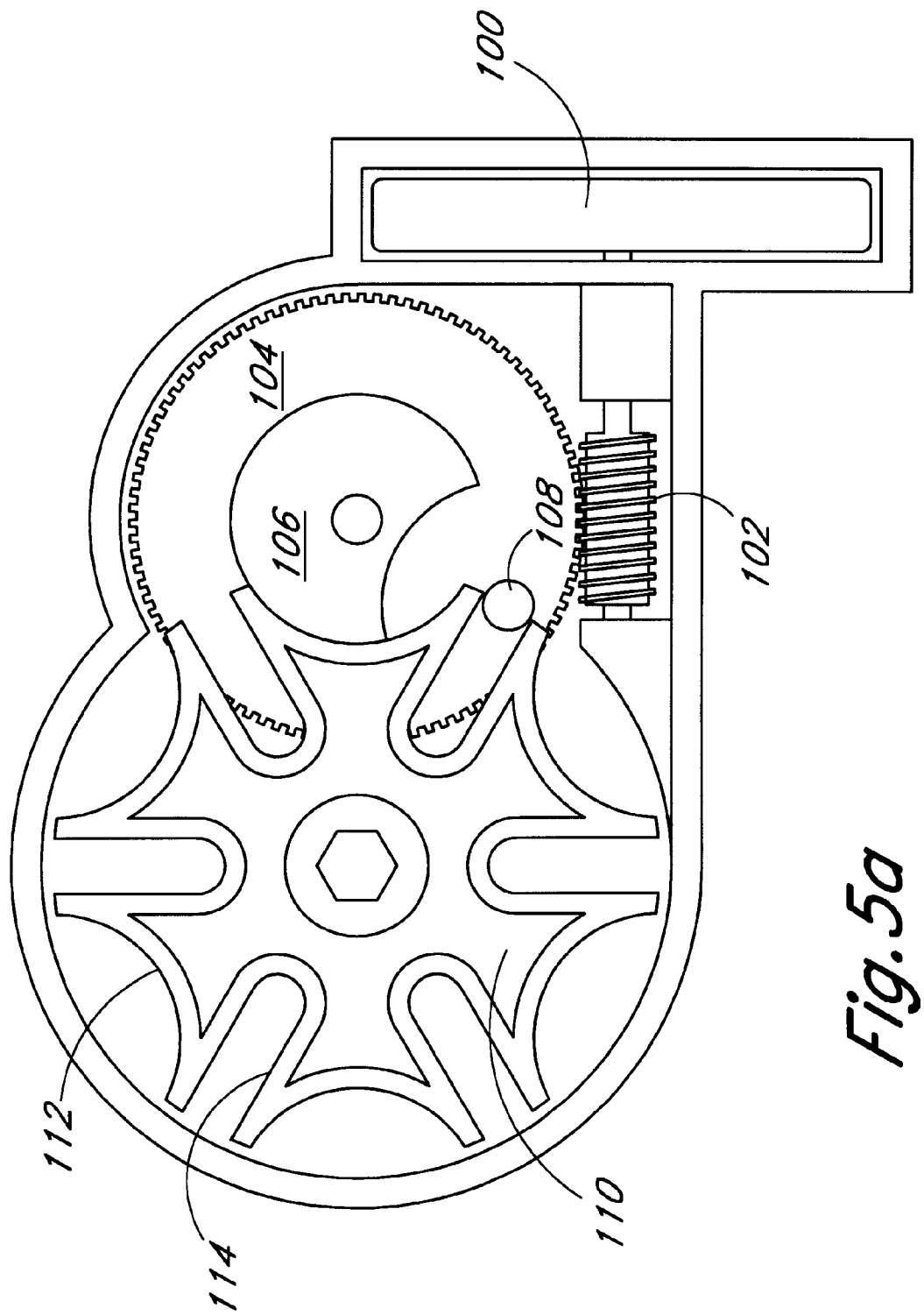
FIG. 5a is a top view of the reduction gear assembly of the valve illustrated in FIG. 5.
Figure 6:
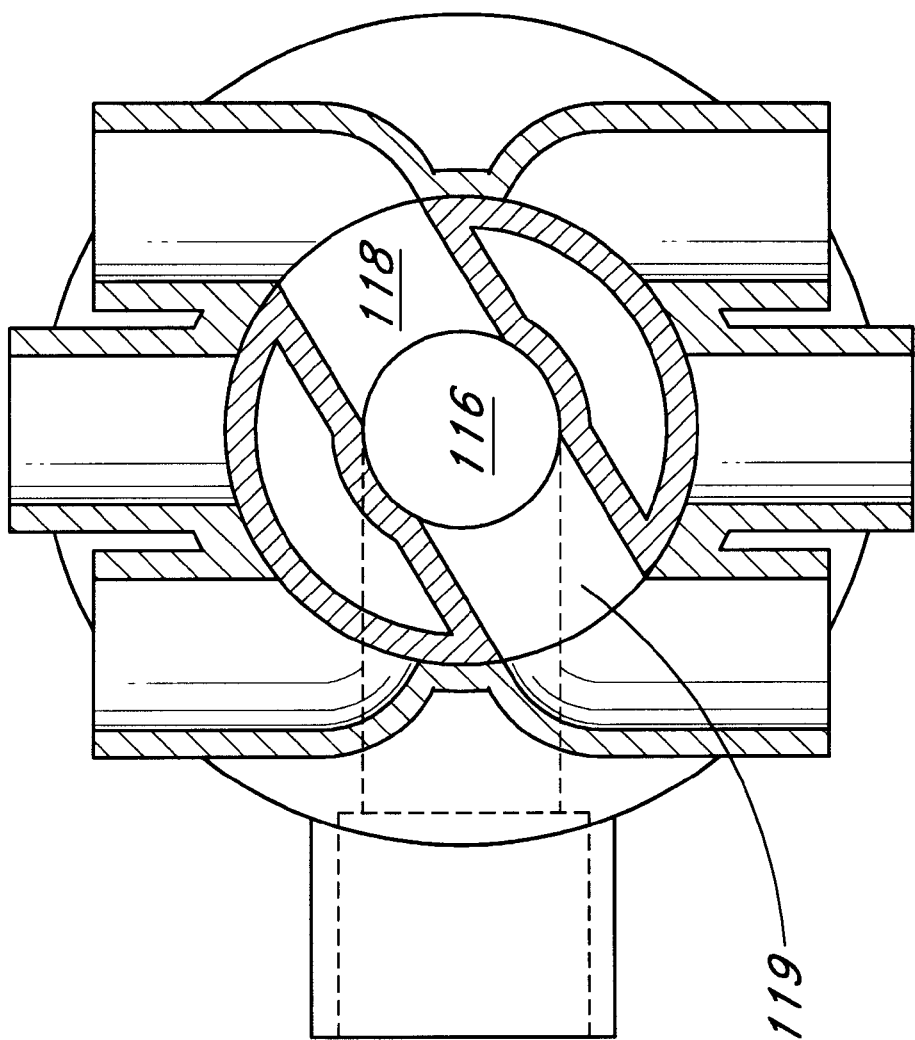
FIG. 6 is a cross-sectional view of the switching mechanism of the valve illustrated in FIG. 5.

An alternate embodiment of the invention employing a Geneva reduction gear drive is illustrated in FIGS. 5, 5a, and 6. As with the first embodiment, the reduction gear drive of this embodiment is driven by a water turbine 100 having a separate water inlet line 101, which rotates a worm gear 102. The worm gear 102 rotates a toothed gear 104. This toothed gear includes a raised cylindrical center section 106 and a peg 108.

The toothed gear 104 opposes a Geneva gear 110 which has a plurality of arcuate faces 112 and slots 114. As the worm gear 102 rotates the toothed gear 104, the peg 108 on the gear 104 engages one of the slots 114 on the Geneva gear, causing the Geneva gear to rotate with the toothed gear 104 through a preset angle. When the Geneva gear 110 has rotated through this angle, the peg 108 moves away from engagement with the slot 114, and the raised center section 106 of the toothed gear 104 rotates to oppose one of the arcuate faces 112 of the Geneva gear. This center section rotates opposite the face 112 of the Geneva gear without moving it until the peg 108 has rotated sufficiently to again come into engagement with another of the Geneva gear's slots 114, whereupon the rotation of the Geneva gear is repeated.

The Geneva gear 110 is connected to a shaft 116 (FIG. 6), to which a selector disk 118 is also attached. As in the first-described embodiment, the selector disk contains openings 119 which direct water from the inlet line 120 into the outlet lines 122 in pairwise fashion. As the Geneva gear 110 rotates, the openings on the selector disk 118 move into opposition with different outlet line openings, thereby periodically routing water to different pairs of outlet lines.

In addition to reduced susceptibility to seizure from contaminant accumulations and the ability to control switching speed independently of water pressure, the Geneva reduction gear drive advantageously provides a sharper switching action between the individual water jets than the reduction gear drive of the first embodiment because of its stepwise, rather than continuous, movement. This more abrupt switching made possible by the use of the Geneva reduction gear drive improves the overall quality of the massage.

Having thus described the present invention, many modifications thereto will become apparent to those skilled in the art to which it pertains without departing from the scope and spirit of the present invention as defined in the appended claims.

What is claimed is:

1. In combination:
    a whirlpool bath having a perimeter wall; massage part of an occupant of said whirlpool, said apparatus
    an array of water jets mounted in said wall of said whirlpool bath to allow said water jets to massage a part of an occupant; and
    a distributing valve connected to said array of water jets for sequentially routing said water flow through said water jets, said distributing valve having an inlet portion, a selector, a first drive shaft, a reduction gear drive, a second drive shaft, a water turbine, and a plurality of outlets, said first drive shaft driven at a first torque by said water turbine and connected to said reduction gear drive, said second drive shaft driven by a second torque, higher than said first torque, by said reduction gear drive and driving said selector, said selector sequentially distributing said water flow through each of said outlets, said outlets connected to said water jets.

2. The combination of claim 1 wherein said reduction gear drive is a Geneva drive.

3. A massaging system for directing water flow to a selected part of an occupant of a whirlpool spa, comprising:
    an array of water jets for sequentially supplying streams of high-pressure water to said part of said occupant; and
    a multiplexing valve connected to said array of water jets for sequentially directing water flow through said jets, said multiplexing valve comprising:
        a water turbine driven by a first torque to rotate at a first rate;
        a reduction gear assembly driven by said water turbine;
        a plurality of water outlets each of said outlets connected to one of said water jets; and
        a selector mechanism driven by said reduction gear assembly at a second rate which is lower than said first rate but at a torque which is higher than said first torque to overcome seizure caused by water borne contaminants.

4. The massaging system of claim 3, wherein said multiplexing valve further comprises:
    a first water inlet for supplying water to said water turbine;
    a second water inlet for supplying water to said outlets;
    an output shaft connected to and driven by said water turbine, said output shaft connected to said reduction gear assembly; and
    a drive shaft connected to said reduction gear assembly and driven by said output shaft at a lower angular speed than said output shaft;
    wherein said selector mechanism is connected to said drive shaft, and said selector mechanism further includes an opening, said opening allowing water from said second water inlet to pass into a selected one of said outlets.

5. The massaging system of claim 3, wherein said reduction gear assembly comprises a Geneva drive.

6. The massaging system of claim 3, wherein said array of water jets are arrange in a rectangular array.

7. A method of massaging an occupant of a whirlpool spa, wherein said whirlpool spa includes an array of water jets mounted in a perimeter wall of said whirlpool spa, said method of massaging an occupant of a whirlpool spa, comprising the steps of:
    driving a water turbine using the energy from a first water supply and a gear reducer to increase the driving torque produced by the turbine;
    rotating a selector, using the output of said turbine, with sufficient torque to overcome the presence of contaminants; and
    discharging water from the array of water jets towards said occupant using the output of said selector to direct water flow from a second water supply to each of said array of jets in a periodic manner.

* * * * *

UNITED STATES PATENT AND TRADEMARK OFFICE
CERTIFICATE OF CORRECTION

PATENT NO. : 6,112,341  
DATED : September 5, 2000  
INVENTOR(S) : G. Moreland

Page 1 of 1

It is certified that error appears in the above-identified patent and that said Letters Patent is hereby corrected as shown below:

Column 5, claim 1,
Line 33, please remove -- massage part of an occupant of said whirlpool, said apparatus --

Signed and Sealed this

Thirtieth Day of October, 2001

Attest:

NICHOLAS P. GODICI  
Attesting Officer  
Acting Director of the United States Patent and Trademark Office